United States Patent
Buchheit et al.

(10) Patent No.: US 8,824,040 B1
(45) Date of Patent: Sep. 2, 2014

(54) ENHANCING LOW LIGHT USABILITY OF ELECTROPHORETIC DISPLAYS

(71) Applicants: Brian K. Buchheit, Weston, FL (US); Scott M. Garrett, Weston, FL (US)

(72) Inventors: Brian K. Buchheit, Weston, FL (US); Scott M. Garrett, Weston, FL (US)

( * ) Notice: Subject to any disclaimer, the term of this patent is extended or adjusted under 35 U.S.C. 154(b) by 0 days.

(21) Appl. No.: 13/935,215

(22) Filed: Jul. 3, 2013

Related U.S. Application Data

(60) Provisional application No. 61/667,728, filed on Jul. 3, 2012.

(51) Int. Cl.
*G02B 26/00* (2006.01)
*G09G 3/34* (2006.01)

(52) U.S. Cl.
USPC .......................................... 359/296; 345/107

(58) Field of Classification Search
USPC ........................... 359/290–300; 345/105, 107
See application file for complete search history.

(56) References Cited

U.S. PATENT DOCUMENTS

| | | | | |
|---|---|---|---|---|
| 6,538,801 B2 * | 3/2003 | Jacobson et al. | ............... | 359/296 |
| 6,970,285 B2 * | 11/2005 | Van Brocklin et al. | ....... | 359/296 |
| 8,670,174 B2 * | 3/2014 | Sprague et al. | ............... | 359/296 |

* cited by examiner

*Primary Examiner* — Mohammed Hasan
(74) *Attorney, Agent, or Firm* — Brian K. Buchheit; Scott M. Garrett; Patents on Demand P.A.

(57) ABSTRACT

An illuminated electrophoretic device comprising of an electrophoretic display having a set of microcapsules suspended within a insulating liquid. The insulating liquid can be sandwiched between a first surface and a second surface, where each microcapsule encapsulates a set of charged particles. The first surface can be transparent, permitting light to be transmitted. A light source can be configured to transmit visible light through the first surface and/or the second surface. The transmitted light can illuminate the microcapsules and/or the insulating liquid.

20 Claims, 3 Drawing Sheets

300

ENHANCING LOW LIGHT USABILITY OF ELECTROPHORETIC DISPLAYS

CROSS REFERENCE TO RELATED APPLICATIONS

This application claims priority to the provisional application entitled, "ENHANCING LOW LIGHT USABILITY OF ELECTROPHORETIC DISPLAYS", Application No. 61/667,728, filed Jul. 3, 2012, and is incorporated herein, in its entirety.

BACKGROUND

The present invention relates to the field of electrophoretic devices and, more particularly, to enhancing low light usability of electrophoretic displays.

Due to the low power consumption and lightweight form factor, electrophoretic displays (EPDs) are becoming increasingly adopted to replace traditional displays such as liquid crystal displays (LCDs). Further, EPDs are being applied to address new solutions where previous technologies have been impractical. Electrophoretic display devices utilize an electronic field to rearrange charged pigment particles within a microcapsule, where the microcapsule is typically suspended in a transparent insulating material. The rearranging of the particles can cause light to be reflected off the particles which can be used to produce visible content on a display such as text and/or images.

One arena in which EPDs are gaining popularity is the electronic paper format category. Electronic paper format can be integrated into areas such as electronic book (e-book) readers, electronic newspapers, wearable displays, and the like. A common drawback of EPDs are their inability to function effectively in certain situations. Since EPDs are a reflective technology which relies on available (e.g. ambient) light, they can often perform poorly in low light situations. For instance, an e-book reader can become difficult to read at night due to insufficient incident light striking the surface of the device.

One solution for low light conditions that have been devised is the inclusion of an external book light attached to EPD devices such as e-book readers. Several problems with this solution exist which make it a less than ideal for many devices and scenarios. The external book light can be cumbersome to attach and position due to not being permanently fixed to the device. Additionally, the book light can provide uneven illumination of the viewing area resulting in a user having to constantly reposition the light to compensate. Further, external book lights can detract from the aesthetic appeal of the EPD which can be a major drawback for device manufacturers and consumers.

In many instances, an external light cannot be used to improve low light usability, rendering this option impractical. For instance, an external light would not be suitable for use with a electrophoretic display deployed at a night club venue. Other scenarios such as extremely low light and no-light environments can be problematic for EPD users.

DETAILED DESCRIPTION

Figure 1:
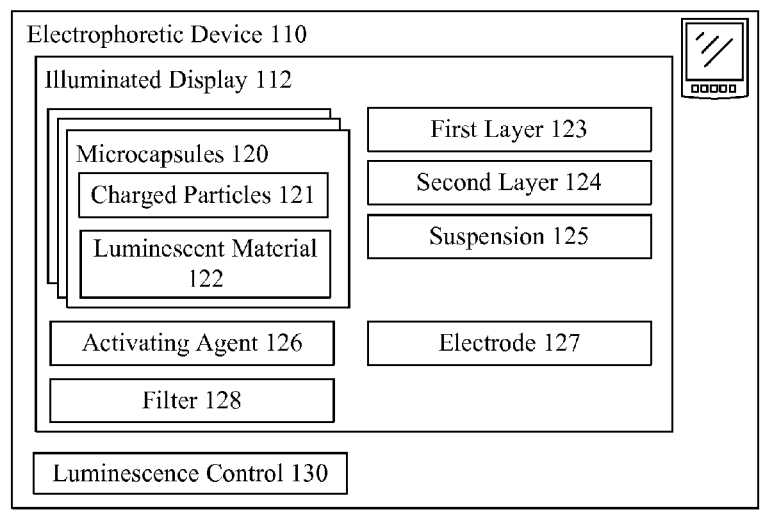
FIG. 1 is a schematic diagram illustrating a system for enhancing low light usability of electrophoretic displays in accordance with an embodiment of the inventive arrangements disclosed herein.
Figure 1:
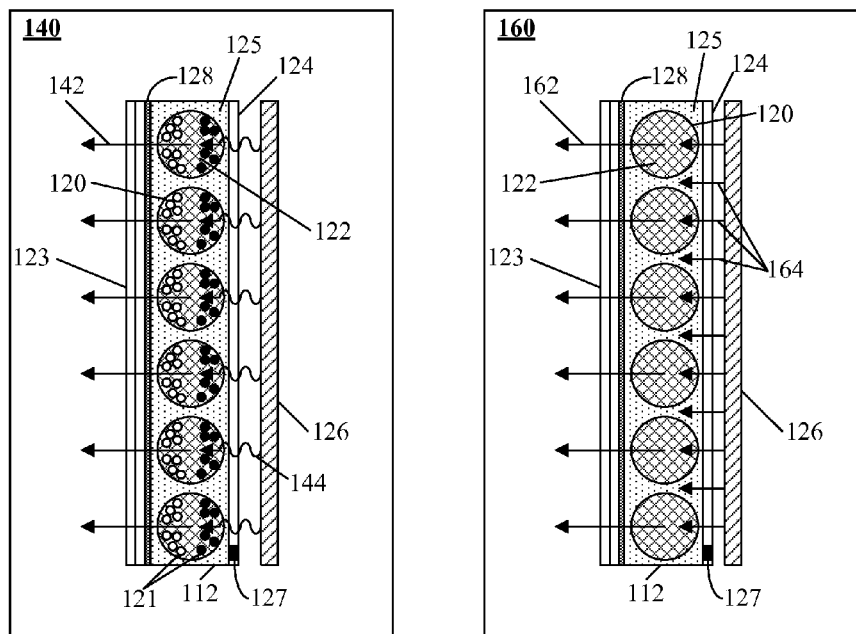

The present invention discloses a solution for enhancing low light usability of electrophoretic displays. In the solution, electrophoretic displays (EPD) can be constructed to have backlighting by imbuing microcapsules within the EPD with luminescent properties. Microcapsules can emit light which can be transmitted toward a viewable surface, improving viewable contrast and sharpness. Microcapsules can comprise of one or more luminescent materials including photoluminescent substances, electroluminescent materials, radioluminescent materials, and the like. EPD light emission can be controlled manually and/or automatically. For instance, an EPD microcapsules can trigged to automatically emit light when ambient light levels reach a determined threshold.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for enhancing low light usability of electrophoretic displays in accordance with an embodiment of the inventive arrangements disclosed herein. In system 100, an electrophoretic device 110 can have improved low light handling through the use of an illuminated display 112. The electrophoretic device 110 can be an electronic paper device such as an E-INK electronic paper (e.g. AMAZON KINDLE). The display 112 can comprise of microcapsules filled with luminescent material 122. The microcapsules 120 can reside within an insulating liquid suspension 125 (e.g. hydrocarbon oil) positioned between a first layer 123 and a second layer 124. The first layer can be a transparent layer where one or more portions of the layer can be exposed as a viewable surface. The second layer can be opaque or transparent depending on the type of device 110 (e.g. double sided electronic paper). When the luminescent material 122 emits light, light can be transmitted through layer 123 which can illuminate display 112.

Embodiments 140, 160 illustrate contemplated configurations for illuminated display 112 of electrophoretic device 110. Embodiments 140, 160 can represent one or more cells of an electrophoretic display 112. Well known and conventional electrophoretic display details have been selectively omitted in embodiments 140, 160 for clarity and should not be construed to limit the invention in any regard. Although, embodiments 140, 160 present solutions for single sided electrophoretic displays, double sided illuminated displays can be achieved utilizing similar configurations. Dimensions of entities within embodiments 140, 160 are for illustrative purposes only and do not directly correlate to implementation dimensions.

Each of the microcapsules 120 can be transparent formations comprising of charged particles 121 which can be rearranged with the application of an electric field. Formations can include traditional polygon shapes such as spheres, cubes, and the like. Microcapsules 120 can be formed from polyethylene or other suitable polymers. The microcapsules 120 can be organized into cells, where each cell can act as one or more pixels. The charged particles 121 within microcapsules 120 can reflect light to produce a visible color. For instance, particles 121 can be a mixture of black particles and white particles for a black/white electrophoretic device 110. Particles 121 can be positively and negatively charged which can cause the particles to be rearranged in the presence of an electric field. Charged particles 121 can include common electrophoretic particles such as titanium dioxide, barium sulfate, and the like. Microcapsules 120 can be filled with other materials having high a refractive index suitable for the device 110 application.

Electrode 127 can create an electric field which can be applied to the microcapsules 120 causing charged particles 121 to migrate closer to either layer 123 or layer 124 depending on the charge of the field generated. For instance, positively charged black particles can migrate layer 123 while negatively charged white particles move closer to layer 124. As such, microcapsules 120 acting as black and white pixels can be controlled to form viewable content on 112.

Display 112 can be illuminated utilizing material 122, which can be a solid, liquid, or gas. Since each microcapsule 120 can comprise of luminescent material which can cause each microcapsules 120 to emit light, each pixel of display 112 can be illuminated. As such, display 112 can provide superior contrast and viewability over traditional electrophoretic displays.

Luminescent material 122 within microcapsules 120 can be a light emitting material reactive to one or more forms of luminescence catalysts. Material 122 can be photoluminescent, electroluminescent, chemiluminescent, radioluminescent, and the like. The photoluminescent materials can be phosphor compounds including, but not limited to, copper activated zinc sulfide, europium activated strontium aluminate, and the like. In one embodiment, display 112 can utilize resonant radiation to cause material 122 to fluoresce.

Illumination intensity, color, and duration can be determined by luminescent material 122. Material 122 type, quantity, and luminescent form can be used to create a wide range of illuminated displays 112. For instance, a small quantity of material 122 can be used to produce displays 112 with a "soft glow". Alternatively, larger quantities of material 122 can be used in combination with a diffuser to achieve the same result.

In one instance, display 112 can utilize permanently luminescent materials to provide continuous illumination for the lifespan of the device 110. For instance, luminescent materials common to wrist watches and glow-in-the-dark toys can be used to cause display 112 to be persistently lit.

In another embodiment, bioluminescent materials can be employed such as green fluorescent protein to achieve luminescence. In yet another embodiment, chemiluminescent materials such as phenyl oxalate can be used for material 122. For instance, disposable flexible displays can be deformed to activate the chemiluminescence which can illuminate the display for a short period of time.

Illuminated display 112 can be activated automatically depending on device 110 capabilities and/or limitations. Luminescence control 130 can facilitate the activation of illuminated display 112 causing display 112 illumination to be enabled. Control 130 can be a software/hardware entity which can be programmatically controlled. In one embodiment, luminescence control 130 can be coupled with an ambient light sensor to detect low light situations and activate the illumination functionality of display 112 in response to the situation. Alternatively, control 130 can be a manually controlled artifact relying on selective user interaction. For instance, device 110 can be an electronic book reader with a backlight controlled by a sliding switch, useful for improving night-time readability.

Filter 128 can be used to modify the color of the light being produced by the material 122 in microcapsules 120. For instance, when white light is emitted from material 122, a green filter can be used to color the transmitted white light to green, which can permit night vision to be maintained. Filter 128 can be additive and/or subtractive based on the light emitted by luminescent material 122. Multiple filters 128 can be used to create non-primary colored lighting when necessary. Further, multiple filters 128 can enable different portions of illuminated display 112 to be differently colored. In one instance, filter 128 can be a flexible polymer sheet positioned between layer 123 and microcapsules 120.

Activating agent 126 can be used to activate the luminescent material 122 within microcapsules 120. In one embodiment, agent 126 can be an electromagnetic field generator used to form an electromagnetic field to affect the luminescent material 122. This results in the fluorescing of material 122 and the illumination of display 112. In another embodiment, agent 126 can be a light source transmitting non-visible light to luminescent material 122, which can cause material 122 to absorb the non-visible light and re-emit visible light.

Embodiment 140 illustrates a cross-section of an illuminated display 112, where the cross-section is perpendicular to the plane of viewing. In embodiment 140, a radio frequency generator 126 can be positioned parallel to the layers 123, 124. The generator can produce radiation 144 which can be absorbed by luminescent material 122. In one embodiment, generator 126 can be positioned at the rear of the display 112 allowing radiation to be absorbed by the material 122 within microcapsules 120. Material 122 can emit a visible light 142 through layer 123 causing display 112 to be illuminated. Radiation 144 can include, but is not limited to, ultraviolet light, infrared light, and the like. Radiation 144 can be distributed uniformly and in any direction necessary to activate luminescent material 122.

Based on the Stokes shift of material 122 emissions 144 can be adjusted to create specific frequencies of visible light. Known decay rate values for the fluorescing of material 122 can be employed to permit display 112 to be continuously illuminated. For instance, generator 126 can pulse intermittently, refreshing the material 122 excitation state. In one instance, material 122 can be a fluorescing material responsive to a wide band of radiation. In the embodiment, modulating the radiation can permit display 112 to be capable of user configurable colored illumination.

In one configuration of embodiment 140, generator 126 can be positioned within a frame surrounding the display 112. In this configuration, emissions 144 can be directed through the suspension 125 and microcapsules 120, parallel to layers 123, 124.

Devices 110 utilizing the embodiment 140 arrangement can include shielding which can serve multiple purposes. Shielding can ensure radiation is not leaked out of the device, ensuring efficient use of power and can be used to protect user from unwanted emissions.

Embodiment 160 illustrates a cross-section of an illuminated display 112, where the cross-section is perpendicular to the plane of viewing. In embodiment 160, electrophoretic devices utilizing a colored suspension 125 can be illuminated by a rear positioned light source 126. The rear positioned light source 126 can be configured to use frequencies of light which can permeate the colored suspension 125. The light source 126 can include, but is not limited to, light emitting diodes (LEDs), photoluminescent materials, electroluminescent substances, and the like. Although colored suspension 125 can absorb light from source 126, microcapsules 120 containing luminescent materials 122 can activate in the presence of light 164. The microcapsules 120 can transmit light 162 towards a viewable surface of display 112.

It should be understood that the solution disclosed herein can be applied to any electrophoretic display which utilizes microcapsules. The solution can be modified to suitable operate with electrophoretic devices which rearrange charged particles 121 horizontally, vertically, and the like. Although monochromatic electrophoretic displays have been mainly presented, illumination can be extended to color electrophoretic devices.

Figure 2:
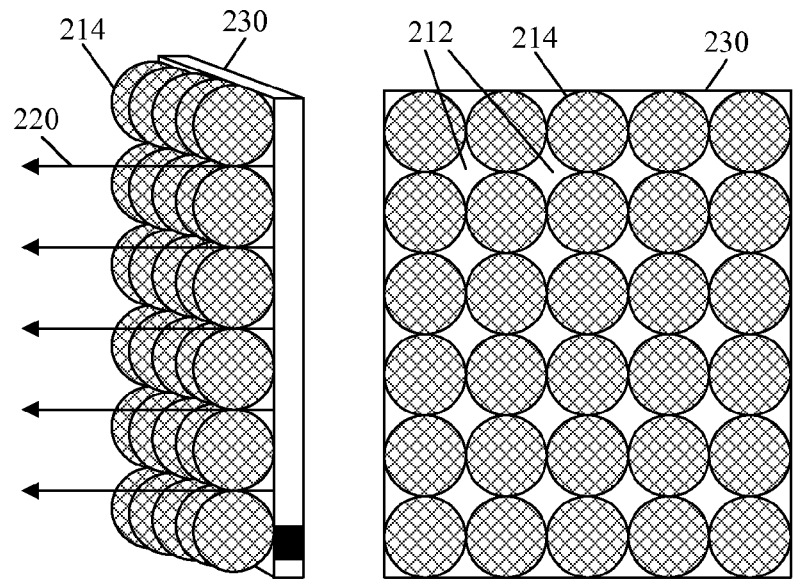
FIG. 2 is a schematic diagram illustrating set of embodiments for enhancing low light usability of electrophoretic displays in accordance with an embodiment of the inventive arrangements disclosed herein.
Figure 2:
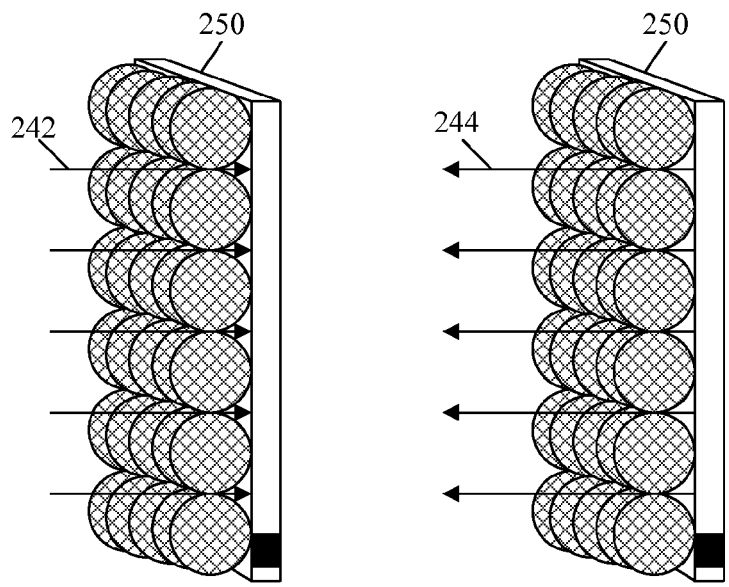

FIG. 2 is a schematic diagram illustrating set of embodiments 210, 240 for enhancing low light usability of electrophoretic displays in accordance with an embodiment of the inventive arrangements disclosed herein. Embodiments 210, 240 can represent one or more cells of an electrophoretic display 112. Well known and conventional electrophoretic display details have been selectively omitted in embodiments 210, 240 for clarity and should not be construed to limit the invention in any regard. Dimensions of entities within embodiments 210, 240 are for illustrative purposes only and do not directly correlate to implementation dimensions.

Embodiment 210 illustrates an illuminated electrophoretic display in a perspective view and a view parallel to the display viewing plane. In embodiment 210, a backlight 230 can be utilized to illuminate an electrophoretic display which utilizes tightly packed microcapsules suspended in transparent insulating liquid. The microcapsules 214 can be arranged together to form a layer of continuous layer separated by gaps 212. The gaps 212 can be filled by the surrounding insulating liquid. Light 220 produced from backlight 230 can be transmitted through gaps 212 and illuminate a viewable area of an electrophoretic display. The backlight 230 can include, but is not limited to, light emitting diodes (LEDs), photoluminescent materials, electroluminescent substances, and the like.

In one configuration, a malleable layer with reflective properties can be utilized at the rear of the display 210 enabling illumination to be attained while maintaining a device flexibility.

Embodiment 240 illustrates an illuminated electrophoretic display in a perspective view. In embodiment 240, a light amplification backdrop 250 can be utilized to illuminate an electrophoretic display 240. Embodiment 240 microcapsules can be arranged in a similar arrangement to embodiment 210 permitting gaps to exist between microcapsules. Incident ambient light 242 can be received by backdrop 250 which can amplify and re-emit light 244 to illuminate the display. Although current generation light amplification technology can be cost prohibitive, embodiment 240 can be suited to highly specialized scenarios. For instance, covert military operations which require operation in low light and no-light scenarios can benefit from embodiment 240.

Drawings presented herein are for illustrative purposes only and should not be construed to limit the invention in any regard. Embodiments 210, 240 can be extended to electrophoretic displays utilizing microcapsules having non-spherical forms. Embodiments 210, 240 illustrate a portion of an illuminated electrophoretic display and should not be construed to limit the invention in any regard.

Figure 3:
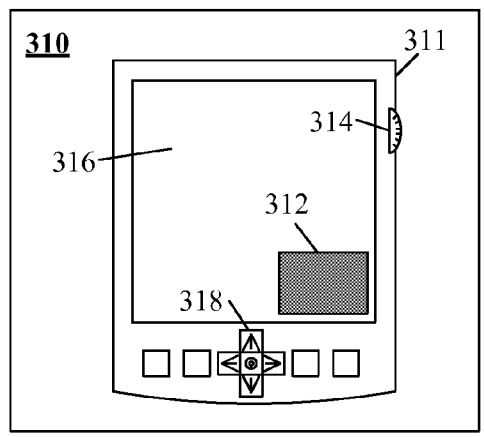
FIG. 3 is a schematic diagram illustrating a set of configurations for illuminated electrophoretic displays in accordance with an embodiment of the inventive arrangements disclosed herein.
Figure 3:
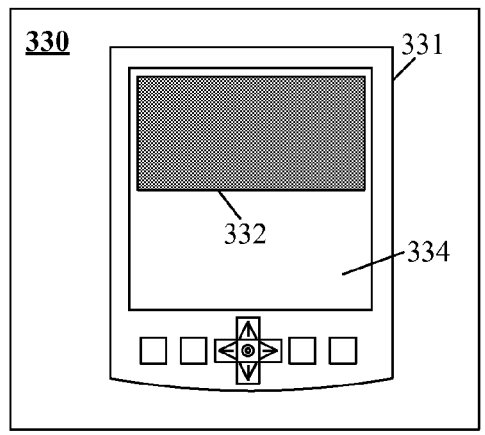
Figure 3:
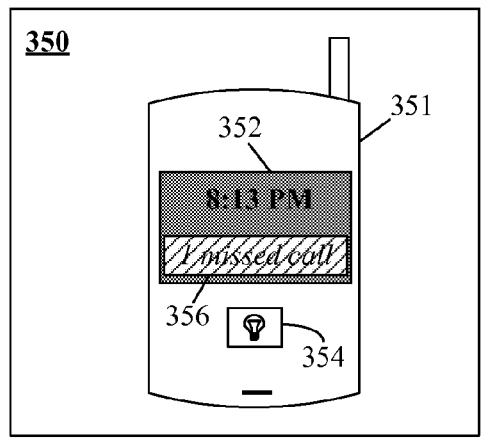

FIG. 3 is a schematic diagram illustrating a set of configurations 310, 330, 350 for illuminated electrophoretic displays in accordance with an embodiment of the inventive arrangements disclosed herein. In configuration 310, 330, 350, illuminated electrophoretic display portions 312, 332, 352 can be integrated into devices 311, 331, 351. Displays 312, 332, 352 can be manually or automatically controlled depending on device limitations (e.g. power) and/or complexity (e.g. cost).

In configuration 310, a portion of an electrophoretic display 316 can comprise of an illuminated section 312. Section 312 can be manually controlled through one or more device artifacts. In one embodiment, jog dial 314 can allow a user to activate and control the brightness level of the illumination in section 312. In the embodiment, illumination intensity can be adjusted in discrete increments corresponding to notches on dial 314. Alternatively, interaction with navigation entities 318 can activate illumination, which can then be used to control brightness levels of illumination. For instance, entity 318 can be a direction pad which can alter brightness levels through the use of up and down direction keys.

In configuration 330, an electrophoretic device 331 can comprise of an illuminated section 332 and a non-illuminated section 334. In one embodiment, section 332 can be permanently illuminated. For instance, during low light situations device 331 can present utilize section 332 exclusively. In another embodiment, section 332 illumination can be a touchscreen responsive to user interaction. In the embodiment, illumination can be controlled by physical touch interaction (e.g. pressing the screen) or through software entities.

In configuration 350, a mobile phone can be fitted with an illuminated electrophoretic display 352, 356. Display 352 can include a second illuminated display 356 which can be selectively enabled. Display 352 can present user configured content including the time and date. When a missed call event is detected, display 352, 356 can become illuminated until user interaction occurs. In one embodiment, displays 352, 356 can be activated and/or deactivated via artifact 354. For instance, display 352, 356 can be differently colored illuminated displays (e.g. green/blue) which can be manually controlled by button 354.

Drawings presented herein are for illustrative purposes only and should not be construed to limit the invention in any regard. Mechanisms for controlling electrophoretic display illumination can include, slider switches, rocker switches, software programs, and the like. In one embodiment, illumination can be selectively controlled by software, permitting regions of an illuminated display to fluoresce while other regions able to be illuminated remain non-illuminated.

The block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for an illuminated electrophoretic device comprising:
    an electrophoretic display having a plurality of microcapsules suspended within a insulating liquid, wherein the insulating liquid is sandwiched between a first surface and a second surface, wherein each microcapsule encapsulates a plurality of charged particles, wherein the first surface is transparent;
    a light source configured to transmit visible light through the first surface, wherein the visible light is generated by components of the first surface, by components of the second surface, by one or more components positioned between the first surface and the second surface, or by combinations thereof; and
    a luminescent substance positioned between the first surface and the second surface, wherein the luminescent substance is a part of the light source that produces and emits visible light that is transmitted through the first surface, wherein the luminescent substance is the insulating liquid, is a substance suspended within the insulating liquid, or is contained within at least a portion of the microcapsules, wherein an energy providing component of the electrophoretic device produces energy using a power source of the electrophoretic device, wherein the energy produced by the energy providing component is converted by the luminescent substance into the visible light, and wherein the power source is a battery of the electrophoretic device or is an AC-to-DC power source that provides DC power to components of the electrophoretic device from mains electricity.

2. The system of claim 1, wherein the first surface comprises a direct current front plane, wherein the second surface comprises a direct current backplane, wherein a direct current voltage is applied across the direct current front plane and the direct current back plane to cause the charged particles to migrate electrophoretically to a plate bearing the opposite charge from that on the particles, wherein the applying of the direct current voltage does not cause the light source to transmit the visible light, wherein an energy providing component of the electrophoretic device generates energy that is converted by the luminescent substance into the visible light, wherein generation of the energy that is converted by the luminescent substance does not substantially cause the charged particles to migrate electrophoretically.

3. The system of claim 1, wherein the second surface is coated with a fluorescent material, wherein the fluorescent material absorbs at least a portion of the visible light from the luminescent substance and responsively emits light of a longer wavelength than that which was absorbed.

4. The system of claim 1, wherein the second surface comprises a metallic foil, which reflects visible light from the luminescent substance, wherein at least a substantial portion of the reflected visible light from the metallic foil passes through the first surface.

5. The system of claim 1, wherein the insulating liquid comprises the luminescent substance.

6. The system of claim 1, wherein the luminescent substance is a gas or liquid that produces the visible light when an ultraviolent energy passes through the luminescent substance.

7. The system of claim 1, wherein a luminescent liquid is positioned between the first surface and the second surface, wherein the luminescent liquid is excited by sound to produce the visible light through sonoluminescence.

8. The system of claim 1, wherein the microcapsule comprises the luminescent substance.

9. The system of claim 1, wherein the light source of the electrophoretic display is activated automatically in response to an ambient light sensor configured to trigger the light source when an ambient light level is detected within a determined threshold.

10. The system of claim 1, wherein the luminescent substance is an inert gas.

11. A system for an illuminated electrophoretic device comprising:
   an electrophoretic display having a plurality of microcapsules suspended within an insulating liquid, wherein the insulating liquid is sandwiched between a first surface and a second surface, wherein each microcapsule encapsulates a plurality of charged particles, wherein the first surface is transparent;
   a luminescent substance positioned between the first surface and the second surface, wherein electrodes of different charges powered by a direct current cause the charged particles of the microcapsules to migrate electrophoretically to a plate bearing the opposite charge from that on the particles, wherein the applying of the direct current does not result in visible light being generated by the electrophoretic device, wherein an energy providing component of the electrophoretic device generates an energy that is converted by the luminescent substance into visible light, which is emitted through the first surface of the electrophoretic display, wherein generation of the energy that is converted by the luminescent substance does not substantially cause the charged particles to migrate electrophoretically.

12. The system of claim 11, wherein the luminescent substance is a liquid.

13. The system of claim 11, wherein the insulating liquid comprises the luminescent substance.

14. The system of claim 11, wherein the luminescent substance excited by sound to produce the visible light through sonoluminescence.

15. The system of claim 11, wherein the microcapsules comprise the luminescent substance.

16. A system for an illuminated electrophoretic device comprising:
   an electrophoretic display having a plurality of microcapsules suspended within a insulating liquid, wherein the insulating liquid is sandwiched between a first surface and a second surface, wherein each microcapsule encapsulates a plurality of charged particles, wherein the first surface is transparent, wherein the first surface comprises a direct current front plane, wherein the second surface comprises an direct current backplane, wherein a direct current voltage is applied across the direct current front plane and the direct current backplane to cause the charged particles to migrate electrophoretically to a plate bearing the opposite charge from that on the particles,
   a light source configured to transmit visible light through the first surface, wherein the visible light is generated by components of the first surface, by components of the second surface, by one or more components positioned between the first surface and the second surface, or by combinations thereof;
   an ambient light sensor; and
   an actuator that automatically activates the light source when the electrophoretic device is in-use in response to the ambient light sensor detecting an ambient light level is below a lower threshold, said lower threshold indicating ambient light conditions make the electrophoretic display difficult for a human to see in absence of activating the light source.

17. The system of claim 16, further comprising:
   a luminescent substance positioned between the first surface and the second surface, wherein the luminescent substance is a part of the light source that produces and emits visible light that is transmitted through the first surface, wherein the luminescent substance is the insulating liquid, is a substance suspended within the insulating liquid, or is contained within at least a portion of the microcapsules.

18. The system of claim 16, wherein the second surface is coated with a fluorescent material, wherein an ultraviolent radiation emitting substance is positioned between the first surface and the second surface, wherein the fluorescent material absorbs ultraviolent radiation form the emitting substance to produce the visible light, which the light source transmits.

19. The system of claim 16, wherein the insulating liquid comprises the luminescent substance, which is illuminated when excited by an energy passing through the luminescent substance to produce the visible light.

20. The system of claim 16, wherein at least a portion of the microcapsules comprises the luminescent substance, which is illuminated when excited by an energy passing through the luminescent substance to produce the visible light.

* * * * *